(12) United States Patent
Abdo et al.

(10) Patent No.: US 7,620,899 B2
(45) Date of Patent: Nov. 17, 2009

(54) WINDOWS DISPLAY SYNCHRONIZATION

(75) Inventors: Nadim Y. Abdo, Bellevue, WA (US);
Ivan Brugiolo, Bellevue, WA (US); Ivan J. Leichtling, Kirkland, WA (US);
Rajneesh Mahajan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 272 days.

(21) Appl. No.: 11/428,290

(22) Filed: Jun. 30, 2006

(65) Prior Publication Data

US 2008/0005694 A1    Jan. 3, 2008

(51) Int. Cl.
*G06F 3/00* (2006.01)

(52) U.S. Cl. .......................... 715/740; 715/797; 709/203

(58) Field of Classification Search .................. 715/750, 715/797, 740; 709/203
See application file for complete search history.

(56) References Cited

U.S. PATENT DOCUMENTS

| | | | |
|---|---|---|---|
| 5,790,127 A | | 8/1998 | Anderson et al. |
| 5,844,553 A | | 12/1998 | Hao et al. |
| 5,920,311 A | | 7/1999 | Anthias |
| 6,137,490 A | * | 10/2000 | Shishido ............... 345/690 |
| 6,271,839 B1 | | 8/2001 | Mairs et al. |
| 6,308,199 B1 | | 10/2001 | Katsurabayashi |
| 6,449,653 B2 | | 9/2002 | Klemets et al. |
| 6,877,027 B1 | * | 4/2005 | Spencer et al. .......... 709/205 |
| 2003/0142139 A1 | * | 7/2003 | Brown et al. .......... 345/800 |
| 2005/0149622 A1 | * | 7/2005 | Kirkland et al. ......... 709/207 |
| 2005/0223334 A1 | | 10/2005 | Guido et al. |
| 2006/0150108 A1 | * | 7/2006 | Adachi et al. ........... 715/750 |
| 2006/0230156 A1 | * | 10/2006 | Shappir et al. .......... 709/227 |

OTHER PUBLICATIONS

Microsoft TechNet "Windows 2000 Services", 10 pages Jul. 1, 2001 http://www.microsoft.com/technet/prodtechnol/windows2000serv/deploy/prodspecs/win2ksvc.mspx (PDF Attachment Article 1).
Norbert A. Streitz, et al. "Dolphin: Integrated Meeting Support across LiveBoards, Local and Remote Desktop Environments", 14 pages 1994 http://wwwbruegge.in.tum.de/teaching/ss03/CSCW-BSE/papers/dolphin.pdf (PDF Attachment Article 2).

* cited by examiner

*Primary Examiner*—William L Bashore
*Assistant Examiner*—Ashraf Zahr
(74) *Attorney, Agent, or Firm*—Workman Nydegger

(57) ABSTRACT

Embodiments of the invention, are directed to synchronizing the presentation of windows between two computing systems. A client computing system participates in a terminal server session with a server computing system. Both computing systems identifying their own windows display information (e.g., client-side for local windows and server-side for remote windows respectively). The server computing system transmits its windows display information to the client computing system. The client computing system accesses the windows display information of the server computing system. The client computing system formulates combined ordering applicable to the presentation of both local and remote windows at the client computing system. The combined ordering is based on both the client side and the server-side windows display information. The client computing system presents windows in accordance with the formulated combined ordering. Additionally or alternatively, the client computing system transmits the formulated combined ordering to the server computing system.

21 Claims, 4 Drawing Sheets

WINDOWS DISPLAY SYNCHRONIZATION

BACKGROUND

Computers are systems composed of various components. Computers often have a motherboard, one or more processors, random access memory (RAM), a hard drive, an optical disc drive, Ethernet, modem, universal serial bus (USB) and other ports, as well as sound, video and other cards. Operating systems are used to interconnect and control computer components, as well as connectable peripheral devices. Operating systems (OS) can also provide a graphical user interface (GUI) to enable the user to more easily interact with applications and with the computer components directly.

Numerous operating systems are in use today, including MICROSOFT Windows®, Macintosh® OS, Unix, Linux, as well as handheld device operating systems such as PalmOS®. Many of the above-mentioned operating systems employ a GUI to provide the user with a graphical interface as opposed to a text-based interface. When the user opens an application, the GUI typically displays a square- or rectangular-shaped box containing text, graphics and selectable buttons or tabs. In many GUI's, the text describes what action will occur if the graphic or button is selected. Such GUI boxes are commonly called windows.

Often a user will open multiple applications, each represented in its own window. In addition, each application is capable of opening its own windows. The OS monitors which window should be displayed on the forefront by tracking when, who or what opened each window. For example, the root window, often called the desktop window, is usually loaded by the OS when the computer is started. The desktop window displays the OS GUI and is typically not closed until the computer is shut down. All other windows, whether opened by the user or by an application, are displayed on top of the desktop window, where each application window subsequently opened is displayed on top of the other windows in the order the applications were opened.

Some applications present unique challenges to an OS when the OS is determining which window to display on the forefront ("window management"). For example, a user may have two applications open, and actively using Application One. The OS displays Application One in the foreground. However, in the background Application Two may be completing a task with the instructions to display a "Task Completed" window when finished with the task. Once Application Two finishes, the OS will display the "Task Completed" window on the foreground—on top of the Application One window. This example, though illustrative, is quite basic. Window management challenges are much more prevalent when the user is running applications such as a remote desktop application or remote applications.

Remote desktop applications, such as Citrix® and MICROSOFT® Terminal Services allow a client to log in to a remote server that creates a virtual workstation on the remote server and transmits a representation of the virtual workstation to the client's computer. The client can then open applications on the virtual workstation via a window opened by the remote desktop application on the client's computer. Both the virtual workstation and the client's local workstation may open new windows or minimize existing windows.

Similarly, remote applications may be initiated by a user on the client's computer where each remote application opens in a new window, which may exist independently of any remote desktop application. For example, a user may initiate a local application as well as one or more remote applications. As the user interacts with the applications, confusion may arise as to which application should be displayed on the forefront of the user's desktop, the remote application window or the local application window. Nevertheless, maintaining a seamless interaction between local applications on the client's desktop and remote applications opened remotely is difficult, yet key to providing a positive user experience.

It should be noted that the subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In one embodiment of this invention, a computing system may be configured to perform a method for synchronizing the presentation of windows between two computing systems, where the first computing system has initiated a terminal server session with a second computing system. The method involves both computing systems identifying their own windows display information. The second computing system transmits its windows display information to the first computing system. The first computing system accesses the windows display information of the second computing system. The first computing system formulates an ordering for the windows, incorporating both the first and the second computing systems' windows display information. The first computing system presents the windows based on the formulated ordering. Additionally or alternatively, the first computing system transmits the formulated ordering to the second computing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to synchronizing windows display information on a plurality of computing systems. In one embodiment of this invention, a computing system may be configured to perform a method for synchronizing the presentation of windows between two computing systems, where the first computing system has initiated a terminal server session with a second computing system. The method involves both computing systems identifying their own windows display information. The second computing system transmits its windows display information to the first computing system. The first computing system accesses the windows display information of the second computing system. The first computing system formulates an ordering for the windows, incorporating both the first and the second computing systems' windows display information. The first computing system presents the windows based on the formulated ordering. Additionally or alternatively, the first computing system transmits the formulated ordering to the second computing system. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 1:
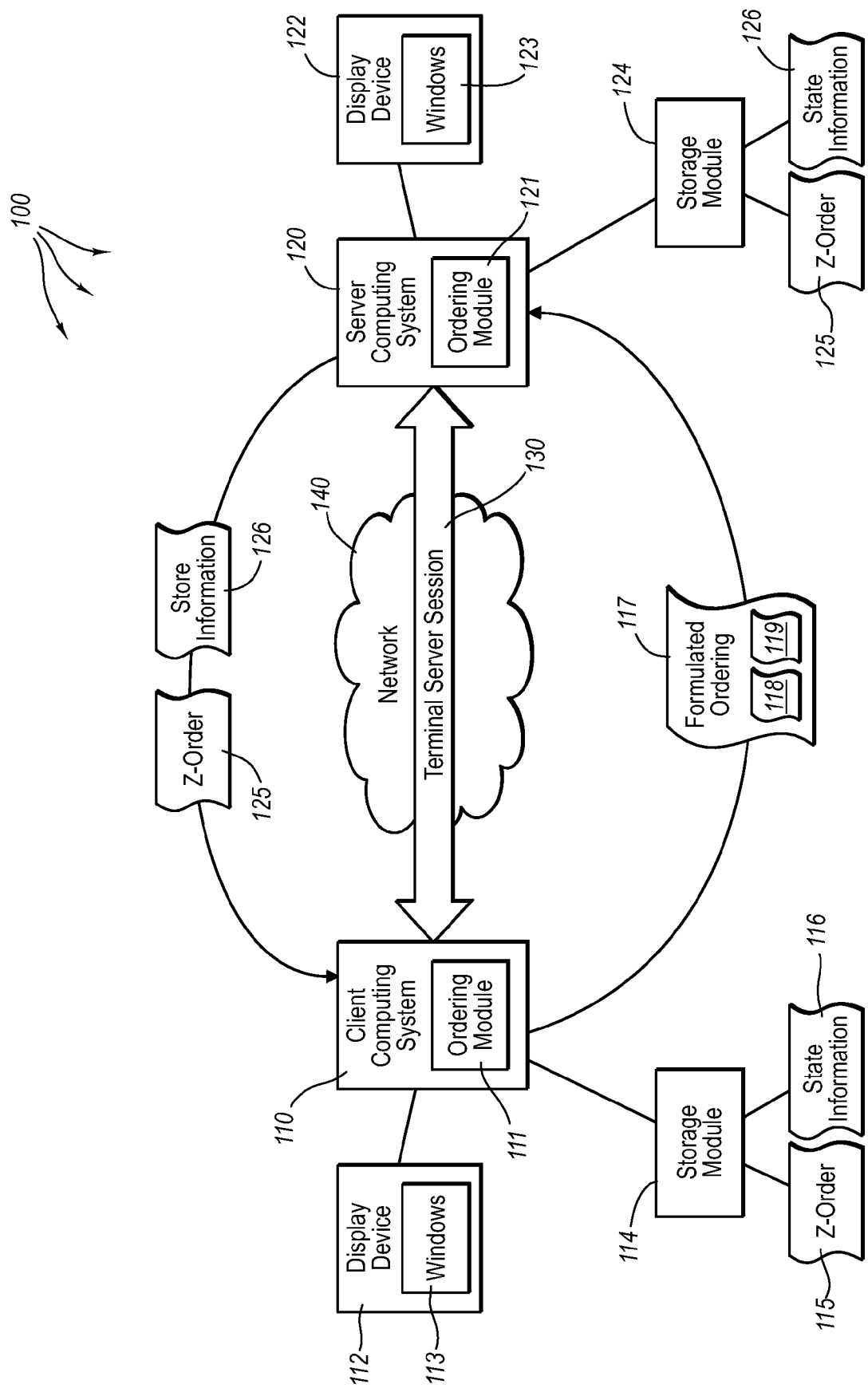
FIG. 1 illustrates a computing environment in which embodiments of the present invention may operate including synchronizing windows display information between a plurality of computing systems.

FIG. 1, illustrates an environment 100 where a client computing system 110 is connected to a server computing system 120 via a computing network 140. In one embodiment, the client computing system 110 and the server computing system 120 are engaged in a terminal server session 130. In a terminal server session, the terminal server may transmit a set of instructions or primatives that enable a client computing system to recreate the display as it appears on the terminal server (e.g. a primative may instruct the client on how to insert a line or rectangle at a certain position). Alternatively, or in conjunction, the terminal server may transmit a bitmap image representative of the display created on the terminal server (e.g. when a representation cannot be broken down into simpler primatives). As the user on the client computing system interacts with software applications run on the terminal server, the terminal server can transmit updated bitmap images which represent changes in the presentation of windows on the terminal server.

Windows, as used herein, are graphical means of representing and facilitating interaction with a software program. Windows are not unique to any one graphical user interface (GUI) and may be used in many types of GUI's in many types of operating systems. Windows display information can be any type of information used by a computing system to aid in rendering the windows. Windows display information includes, but is not limited to, windows display priority order (Z-order), windows state information such as maximized state, minimized state, window size and shape, windows boundaries, whether or not the window is activated, etc. and any other information useful in determining how windows should be displayed in a GUI.

Many times when a user is using a remote software application (an application that is run on a terminal server), the user may be running one or more local applications (applications that are run on the client computing system and do not require interaction with another computing system). For example, a user on a client computing system 110 may open Microsoft® Word locally and open Microsoft® Outlook and Microsoft® Excel remotely. Each application would be represented on the client computing system 110 in its own window 113. The windows are typically arranged and displayed based on a windows display priority order. This windows display priority order is often called (and is referred to herein as) a Z-order.

Windows presentation in a GUI is typically arranged by a windows desktop manager. The order in which the windows desktop manager displays the windows 113 is based on the Z-order. The base window, often called the desktop window, is the lowest in priority (i.e. it has the lowest Z-order). Any window from an application initiated by a user or by the client computing system will be displayed on top of the desktop window. The desktop window is the default window and will thus be displayed on the foreground if no other windows are open, or alternatively, if all of the open windows are minimized. As the user initiates and interacts with applications, different application windows will appear in the foreground while others are relegated to the background. For example, if a user or application activates a window by selecting it, the selected window will appear in the foreground (it now has the highest Z-order). The last activated window will either be entirely covered by the activated window or partially covered, leaving a portion of the last activated window still visible.

Confusion as to which window should be displayed on the foreground may occur when a client is engaged in a terminal server session and has opened one or more remote applications. For example, a user may open Microsoft® Word ("Word") locally, and then open Microsoft® Outlook ("Outlook") and Microsoft® Excel ("Excel") remotely. In this example, both the client computing system 110 and the server computing system 120 have their own windows Z-order (115 and 125, respectively) stored in storage modules 114 and 124, respectively. The client computing system 110 would place the Word application window at the top of its Z-order, while the server computing system 120 would place the Excel window at the top of its Z-order followed by the Outlook window.

All three windows would be represented on the client computing system 110. So if, for example, the user activated Word, then activated Excel, and then minimized Excel the client computing system's 110 Z-order would conflict with the server computing system's 120 Z-order. The client computing system's Z-order would indicate that Word is the next highest priority (after Excel) while the server computing system's Z-order would indicate that Outlook is the next highest priority (after Excel) because the server computing system 120 has no knowledge of application windows on the client computing system 110.

Figure 2:
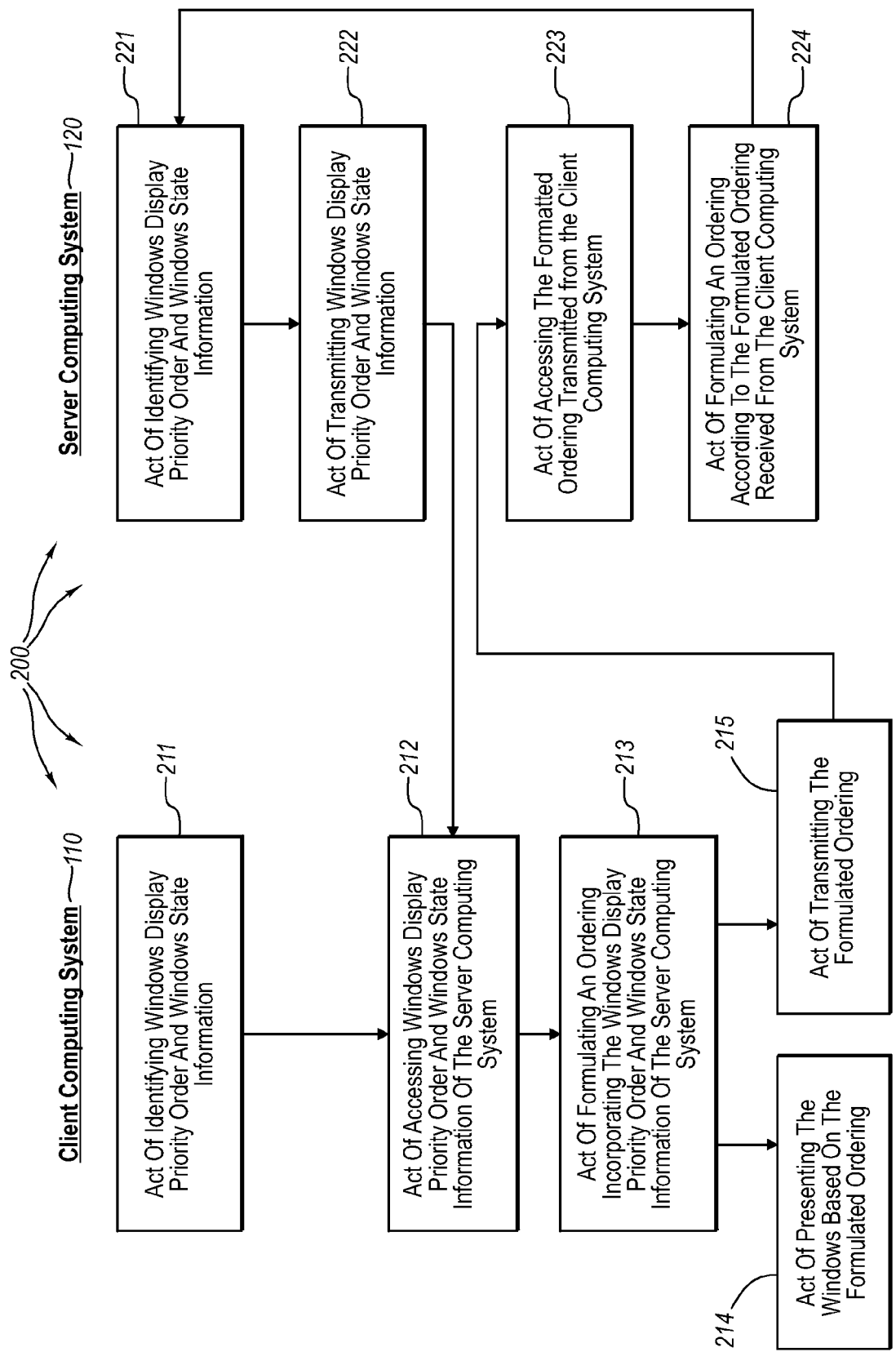
FIG. 2 illustrates a flowchart of a method for synchronizing windows display information between numerous computing systems.

In one embodiment of this invention, the client computing system 110 and the server computing system 120 synchronize their Z-orders (115 and 125) and windows state information (116 and 126). Windows state information ("state information") may include windows minimization state, windows maximization state, windows location and/or windows boundaries. State information may also include information that indicates whether the server computing system 120 transmitted the "client" portion of the window or both the "non-client" and the "client" portions of the window. The client portion of a window is the portion controlled by the software application. The non-client portion of the window is the frame within which the client portion is shown. The frame may include the outer edges of the window as well as the common "File," "Edit," "View," etc. menu option bar. In this embodiment, the client computing system 110 and the server computing system 120 synchronize their Z-order and windows state information by performing the method 200 as illustrated in FIG. 2.

As the method 200 may be performed in the context of the environment 100 of FIG. 1, the method 200 of FIG. 2 will now be described with frequent reference to FIG. 1. FIG. 2 illustrates a flowchart of a method 200 for synchronizing the Z-order (115 and 125) and windows state information (116 and 126) of the client computing system 110 and the server computing system 120. Acts that are performed by the client computing system 110 are illustrated in the left column of FIG. 2 under the heading "Client Computing System—110". Acts that are performed by the server computing system 120 are illustrated in the right column of FIG. 2 under the heading "Server Computing System—220".

Method 200 includes an act of identifying windows display priority order and windows state information (act 211). For example, the client computing system 110 can identify Z-order 115 and state information 116. The client computing system 110 is thus aware of which windows are activated, which are minimized or maximized, what the boundaries of each window are, and where each window fits in the Z-order.

Method 200 includes an act of identifying windows display priority order and windows state information (act 221). For example, the server computing system 120 can identify its own Z-order 125 and state information 126.

Method 200 includes an act of transmitting windows display priority order and windows state information (act 222). For example, the server computing system 120 transmits its Z-order 125 and state information 126 to the client computing system 110. Method 200 also includes an act of accessing windows display priority order and windows state information of the server computing system 120 (act 212). For example, the client computing system 110 may receive and access the windows display priority order and windows state information of the server computing system 120 and may be thus apprised as to what the server computing system 120 indicates the Z-order and state information ought to be.

Method 200 includes an act of formulating an ordering incorporating the windows display priority order and windows state information of the server computing system (act 213). For example, the client computing system 110 ordering module 111 may formulate an ordering for how the client computing system 110 will present its windows. In the formulation, the client computing system 110 incorporates the Z-order 125 and state information 126 of the server computing system 120 with the Z-order 115 and state information 116 of the client computing system 110. The ordering formulated by the client computing system is a combined set of instructions for displaying the windows of both local applications and remote applications. The formulated ordering is based on both the client and the server computing system's Z-orders (115 and 125) and state information (116 and 126). In one embodiment, the method for formulating an ordering is as illustrated in method 300 of FIG. 3.

Figure 3:
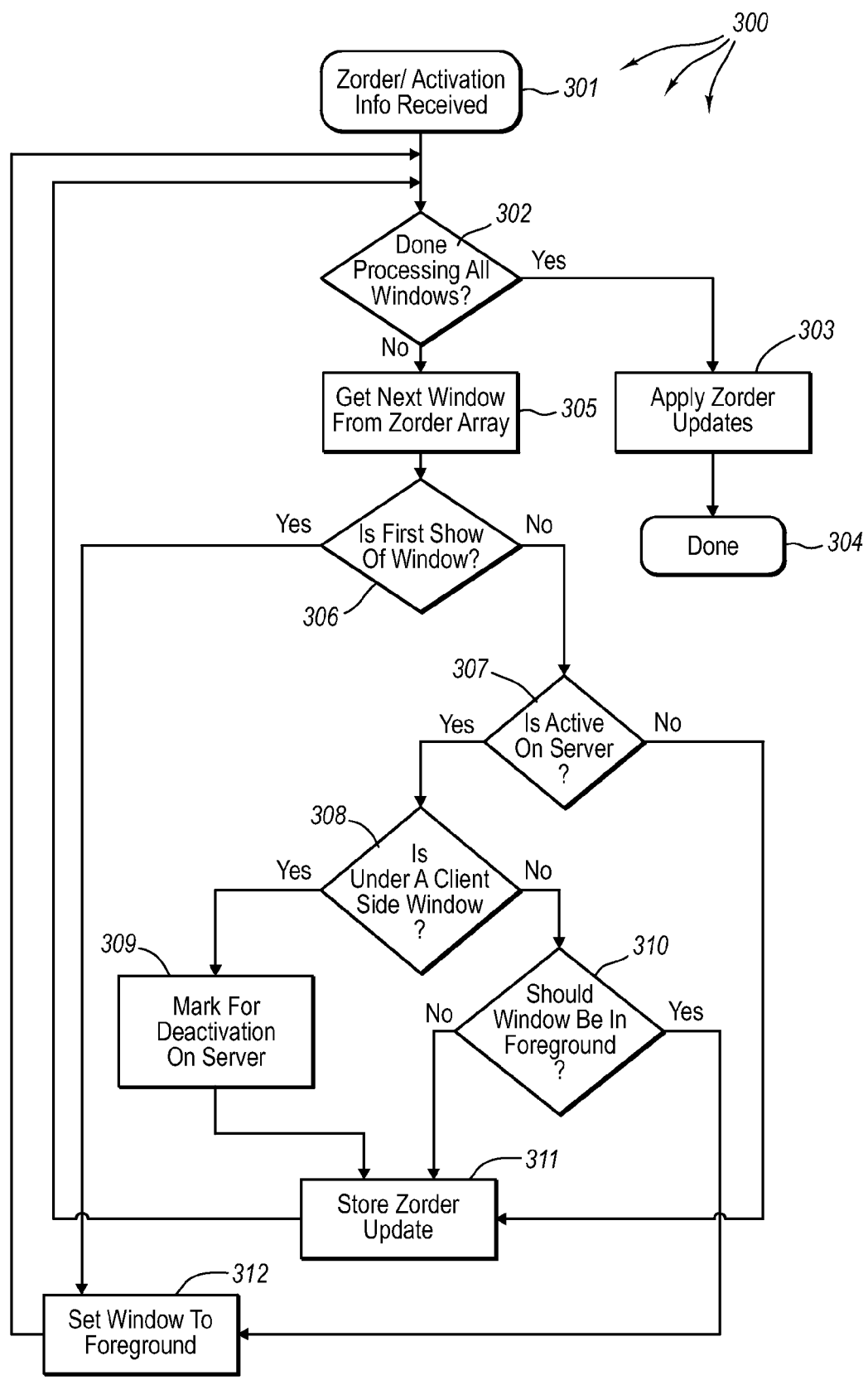
FIG. 3 illustrates a flowchart of a method for formulating an ordering in accordance with embodiments of the present invention.

FIG. 3 illustrates a method 300 for a client computing system 110 to formulate an ordering, for example, based on the Z-order 125 and state information 126 received from the server computing system 120 (act 301). The client computing system 110 determines whether all windows on the server computing system 120 have been processed. If all windows have been processed, the client computing system 110 may then apply the Z-order updates to its own Z-order 115 (act 303) and end the method (state 304). If there are windows that have not been processed, the client computing system 110 processes the next window from the Z-order 125 of the server computing system 120.

The client computing system 110 determines whether the window is being activated for the first time on the client computing system 110 (act 306). If the window is being activated for the first time, the window is set to the foreground (act 312) on the display device 112 (see FIG. 1) of the client computing system 110. If not, the client computing system 110 determines whether the window is activated on the server computing system 120 (act 307). If the window is not activated on the server computing system 120, the window's Z-order is stored in the storage module 114 of the client computing system 110. If the window is activated on the server computing system 120, the client computing system 10 determines whether the window should be displayed under the window of a local application (i.e. the local application has a higher Z-order) (act 308).

Continuing this example, if the window should be displayed under the window of a local application, the client computing system 110 will mark the window for deactivation on the server computing system (act 309) and store the window's Z-order in the storage module 114. If the window should not be displayed under the window of a local application, the client computing system 110 determines whether the window should be displayed in the foreground (act 310). If the window should be displayed in the foreground, the client computing system 110 will set the window to the foreground on the display device 112 (act 312). If the window should not be displayed in the foreground, the client computing system 110 will store the window's Z-order in the storage module 114.

Referring again to method 200 of FIG. 2, Method 200 includes an act of presenting the windows based on the formulated ordering (act 214). In one embodiment, after formulating an ordering the client computing system 110 may perform the act of presenting the windows 113 on the display device 112 based on the formulated ordering 117. Presenting the windows 113 on the display device 112 involves displaying, displaying parts of, or not displaying each window 113 based on the formulated ordering 117. For example, if the formulated Z-order 118 and state information 119 in the formulated ordering indicate that a window 113 should be displayed on the foreground, that window 113 will be displayed in the foreground and all other windows (representing local or remote applications) will either not be displayed or only portions will be displayed depending on the boundaries of the window 113 displayed in the foreground Method 200 of FIG. 2 also includes an act of transmitting the formulated ordering (act 215). For example, the client computing system 110 may, alternatively or in addition to presenting the windows, transmit the formulated ordering 117 which includes the formulated Z-order 118 and the formulated state information 119.

Note that in some embodiments, the formulated ordering 117 may include only a description of the changes made, if any, to the server computing system's Z-order 125 and windows state information 126. In other words, instead of sending the entire formulated ordering, a reduced amount of information may be sent. For example, the server may not need to know why the ordering changed, the ordering of the client computing system or local windows 113, or if no changes are needed. As such, a description of only the changes needed on the server computing system 120 may be sent. Of course, there may be instances where this additional information may be needed, and therefore the use of sending only a description of the changes made is used herein for illustrative purposes only and is not meant to narrow or otherwise limit the scope of embodiments herein.

Method 200 also includes an act of accessing the formulated ordering transmitted from the client computing system (act 223). In one embodiment, the server computing system 120 may access the formulated ordering 117 transmitted from the client computing system 110 (act 223).

Method 200 includes an act of formulating an ordering according to the formulated ordering received from the client computing system (act 224). For example, the server computing system 120, using an ordering module 121, may as formulate a second ordering based on the formulated ordering 117 received from the client computing system 110 (act 224). For instance, if the formulated ordering 117 indicates that a local application on the client computing system is being displayed on the foreground, then the server computing system 120 may reorder its Z-order 125 and update its state information 126 based on the formulated ordering 117. The server computing system 120 may additionally or alternatively display windows 123 according to the formulated ordering 117 on a display device 122. As will be appreciated, the windows on the server computing system 120 may be virtual windows that are not actually displayed on a display device.

Next, the server computing system 120 of method 200 may loop back to act 221 and reinitialize method 200 if the server computing system 120 determines that the method 200 should be reinitiated. For example, the server computing system 120 may determine that the method 200 should be reinitiated if the server computing system 120 detects that it needs to update the client computing system 110 due to changes thereon.

Figure 4:
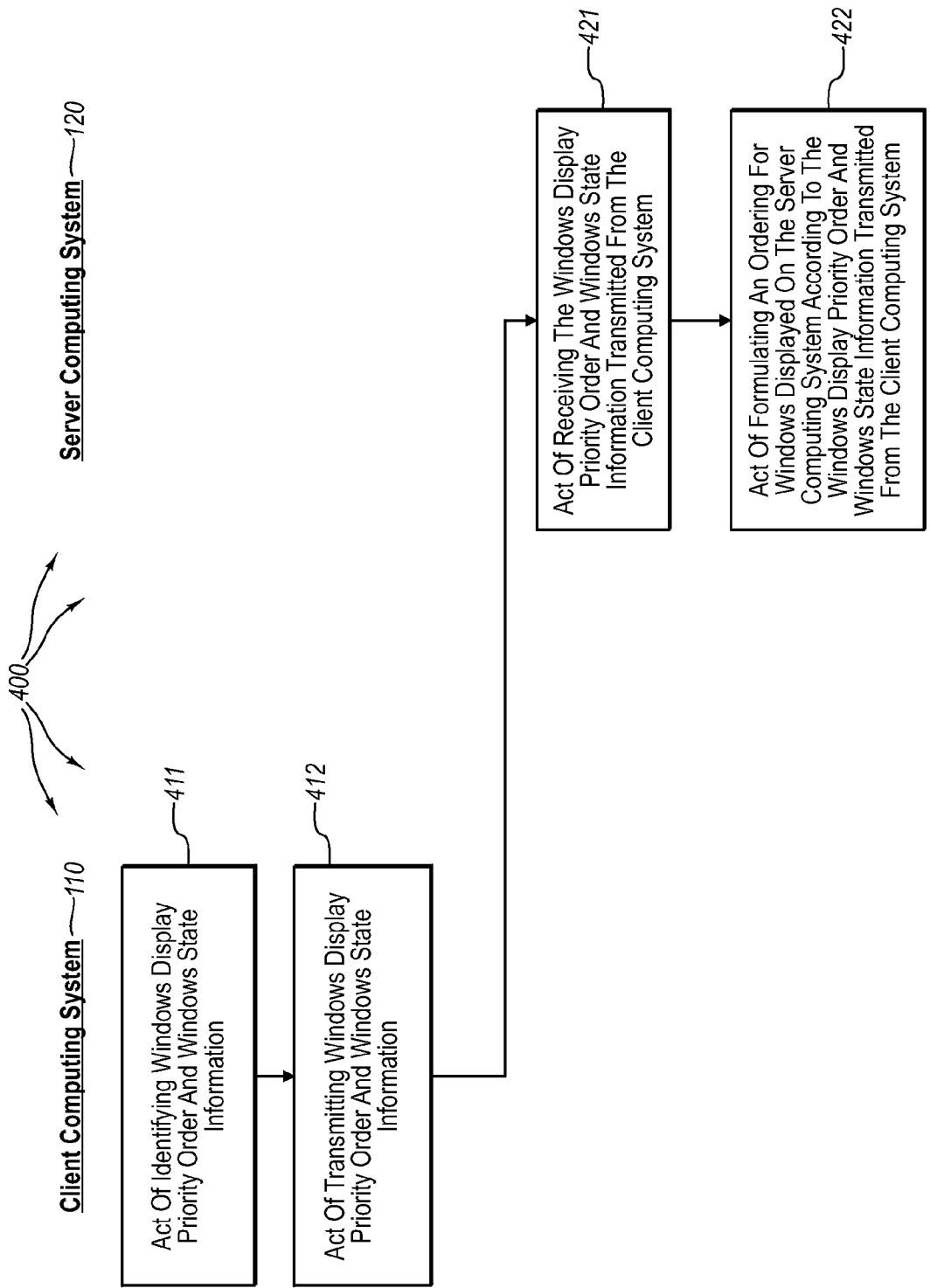
FIG. 4 illustrates a flowchart of an alternative method for synchronizing windows display information between numerous computing systems.

FIG. 4 illustrates a flowchart of an alternative method 400 for synchronizing the Z-order (115 and 125) and windows state information (116 and 126) of the client computing system 110 and the server computing system 120. As the method 400 may be performed in the context of the environment 100 of FIG. 1, the method 400 of FIG. 4 will now be described with frequent reference to FIG. 1. Acts that are performed by the client computing system 110 are illustrated in the left column of FIG. 2 under the heading "Client Computing System—110". Acts that are performed by the server computing system 120 are illustrated in the right column of FIG. 2 under the heading "Server Computing System—220".

In one embodiment, method 400 includes an act of identifying windows as display priority order and windows state information. For example, the client computing system 110 may identify its own Z-order 115 and windows state information 116 (act 411). One reason that the client computing system 110 can identify its own Z-order 115 is that in some cases, the client computing system 110 will have both the client and the non-client portions of the windows. Thus, in these instances, the client computing system 110 is capable of rendering windows display information with or without any knowledge of the server computing system's 120 Z-order 125 or windows state information 126. In such a scenario, the ordering can be completely driven by the client computing system 110 and the server computing system may be in a reactive mode where it is just receiving updates from the client computing system 110 and synchronizing its Z-order 125 (or a representation thereof as described below) and windows state information 126 based on the client computing system's 110 Z-order 115 and windows state information 116.

Next, method 400 also includes an act of transmitting windows display priority order and windows state information. For example, the client computing system 110 may transmit Z-order 115 and windows state information 116 (act 412).

Method 400 also includes an act of accessing or receiving the windows display priority order and windows state information transmitted from the client computing system. For example, the server computing system 120 may access the Z-order 115 and windows state information 116 transmitted from the client computing system 110 (act 421). Optionally, the server computing system 120 may store the Z-order 115 and windows state information 116 transmitted from the client computing system 110 for future reference or updates.

Method 400 also includes an act of modifying the windows display priority order and windows state information on the server computing system according to the windows display priority order and windows state information of the client computing system. For example, the server computing system 120 may modify the Z-order 125 and windows state information 126 on the server computing system 120 according to the Z-order 115 and windows state information 116 of the client computing system 110 (act 422).

As previously noted, because the client 110 has full information about the windows display (i.e., the full windows area), the ordering 115 (and state information 116) can be completely driven by the client computing system 110. As such, the server computing system 120 will be in a reactive mode where it receives updates from the client 110 and keeps its 120 ordering (or a representation thereof) in sync. In such case, the client computing system 110 and the server computing system 120 may be synchronized without the server transmitting any Z-order 125 or windows state information 126 to the client computing system 110.

Note that in some embodiments, the Z-order 125 and windows state information 126 on the server computing system 120 may be a representation of the client computing system's Z-order 115 and windows state information 116—as opposed to the actual Z-order 125 and windows state information 126 for the server 120. In such cases, the server computing system 120, rather than modifying its own Z-order 125 and windows state information 126, modifies a representation of the client computing system's 110 Z-order 115 and windows state information 116. In other words, if the server 120 is maintaining or sharing applications with numerous clients, the server just maintains a representation of the Z-order 115 and windows state information 116 for each client 110, while its own windows display information 123, 126 may differ. Optionally, windows display information based on the modified representation of the client computing system's 110 Z-order 115 and windows state information 116 may be displayed on a display device 122.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a client computing system in a computing environment comprising a plurality of computing systems, the client computing system interacting with applications to present data in windows at the client computing system, the client computing system presenting data for one or more local applications running locally at the client computing system, the client computing system also presenting data for one or more remote applications running remotely at a server computer system through interoperation with the server computing system, a method for synchronizing the presentation of windows between the client computing system and the server computing system, the method comprising:

an act of the client computing system identifying a client-side windows display priority order and a client-side windows state information generated at the client computing system for displaying one or more windows for local applications;

an act of the client computing system receiving a server-side windows display priority order and a server-side windows state information from the server computing system, the server-side windows state information generated at the server computing system for displaying a plurality of windows for remote applications, the server side state information including creation instructions for recreating individual windows for remote applications at the client computing system;

an act of the client computing system formulating a combined windows display priority order based on the client-side windows display priority order and the client-side windows state information along with the server-side windows display priority order and the server-side windows state information, the combined windows display priority a single display priority ordering collectively applicable to presentation of windows for both local applications and remote applications at the client computing system, the combined windows display priority order indicating that windows for at least two remote applications have different display priority orders, the combined windows display priority order indicating that a window for a first remote application of the at least two remote applications has a higher display priority order than the display priority order for a window for a local application and that a window for second remote application of the at least two remote applications has a lower display priority order than the display priority order for the window for the local application; and an act of the client computing system presenting the one or more windows for local applications along with the plurality of windows for remote applications at the client computing system in accordance with the combined windows display priority order so as to present a combination of windows from both local applications and remote applications based on the single display priority ordering, presentation of the windows including interleaving the window for the local application between the window for the first remote application and the window for the second remote application.

2. The method of claim 1, wherein the act of the client computing system identifying a client-side windows display priority order and a client-side windows state information comprises an act of the client computing system identifying a client-side Z-order.

3. The method of claim 1, wherein the act of the client computing system identifying a client-side windows display priority order and a client-side windows state information comprises an act of the client computing system identifying a client-windows display priority order and a client-side windows minimization state, windows maximization state, windows location and/or windows boundaries.

4. The method of claim 1, wherein the act of the client computing system identifying a client-side windows display priority order and a client-side windows state information for the client computing system comprises an act of a client computing system that is participating in a terminal server session identifying a client-side windows display priority order and client-side windows state information for windows of local applications at client computer system.

5. The method of to claim 1, wherein the act of the client computing system receiving a server-side windows display priority order and a server-side windows state information comprises an act of the client computing system that is participating in a terminal server session accessing a servers-side windows display priority order and servers-side windows state information from the server computing system.

6. The method of claim 1, further comprising an act of transmitting the combined windows display priority order to the server computing system so that the server computing system can synchronize the server-side windows display priority order with the combined windows display priority order.

7. The method of claim 1, wherein windows state information includes non-client portions of the window.

8. The method of claim 1, wherein windows state information includes a combination of client and non-client portions of the window.

9. The method of claim 1, wherein the client computing system comprises a client computing system that is participating in a terminal server session with the server computing system.

10. The method of claim 1, wherein the server computing system comprises a server computing system that is participating in a terminal server session with the client computing system.

11. The method of claim 1, wherein the act of formulating combined windows display priority comprises performing one or more of the following acts for each window of the server computing system:

an act of the client computing system determining whether the window is being displayed at the client computing system for the first time;

an act of the client computing system determining whether the window is active on the server computing system;

an act of the client computing system determining whether the window was placed behind a window representing a local application of the client computing system;

an act of the client computing system determining whether the window should be displayed on the foreground of the client computing system; and an act of the client computing system setting the window of the server computing system in the foreground at the client computing system.

12. The method of claim 11, wherein an active window is a window that is presented on the foreground of the display at the server computing system.

13. The method of claim 11, wherein the server windows display priority order comprises a server-side Z-order and the server-side windows state information comprises a windows minimization state, windows maximization state, and at least one of windows location or windows boundaries.

14. A computer program product for use at a server computing system in a computing environment comprising a plurality of computing systems, the server computer system interacting with applications to present data in windows at the server computer system, the server computing system providing data for remote presentation at a client computing system through interoperation with the client computing system, remotely presented data at the client computing system presented along with data of local applications at the client computing system, the computer program product for implementing a method for synchronizing the presentation of windows between the client computing and the server computing system, the computer program product comprising one or more computer storage media having stored thereon computer-executable instructions that, when executed by one or more processors , cause the server computing system to perform the method, including the following:

identify a server-side windows display priority order and a server-side windows state information generated at the server computing system for ordering individual windows for applications at the server computer system that appear as remote applications at the client computer system, the server-side windows display priority order and server-side windows state information for use in presenting individual windows at the client computing system for applications that appear as remote applications at the client computing system, the server side state information including creation instructions for recreating individual windows for applications that appear as remote applications at the client computing system;

transmit the server-side windows display priority order and the server-side windows state information to the client computing system for use in formulating a combined windows display priority order that provides a single display priority ordering applicable to presentation of remotely presented windows from the server computing system presented at the client computing system and to presentation of windows for local applications presented at the client computing system;

receive the combined windows display priority order from the client computing system, the combined windows display order collectively applicable to individual windows for applications local to the client computing device and to individual windows for applications that appear as remote applications at the client computing device such that individual windows for applications that appear as remote applications are presented based on a windows display priority order formulated at the client computing device and the client computing device does not view windows for applications that appear as remote applications as all having the same windows display priority order, the combined windows display priority order based on a client-side windows display priority order and a client-side windows state information along with the server-side windows display priority order and the server-side windows state information, the combined windows display priority order including a combined set of instructions for displaying windows of both local applications and remote applications at the client computing system in accordance with the combined windows display priority order, the combined windows display priority order indicating that the display priority for at least one local application is between the display priority of a first application that appears as remote and the display priority of a second application that appears as remote; and present windows at the server computing system in accordance with combined windows display priority order such that when the windows are subsequently remotely presented at the client computing system the windows are appropriately ordered from presentation at the client computing system relative to windows for local applications of the client computing system.

15. The computer program product according to claim 14, wherein computer-executable instructions that, when executed, cause the server computing system to receive the combined windows display priority order comprises computer-executable instructions that, when executed, cause the server computing system to receive a formulated Z-order that is applicable to determine the presentation order of both remote and local windows presented at the client computing system.

16. The computer program product according to claim 15, wherein computer-executable instructions that, when executed, cause the server computing system to receive the combined windows display priority order comprises computer-executable instructions that, when executed, cause the server computing system receive a windows minimization state, windows maximization state, windows location and/or windows boundaries from the client computing system.

17. A computer program product in accordance with claim 14, further comprising: computer-executable instructions that, when executed, cause the server computing system to re-formulate a new server-side windows display priority order and computer-executable instructions that, when executed, cause the server computing to send the new server-side windows display priority to the client computing system for use in updating the combined windows display priority order.

18. A computer program product in accordance with claim 14, further comprising computer-executable instructions that, when executed, cause the server computing system to present windows on a virtual display device according to the combined windows display priority.

19. A computer network including a client computing system and a server computing system, the client computing system and the server computing system participating in a terminal server session with one another:

the client computing system configured to interact with applications to present data in windows at the client computing system, the client computing system presenting data for one or more local applications running locally at the client computing system, the client computing system also presenting data for one or more remote applications running remotely at a server computer system through interoperation with the server computing system, the client computing system including:

one or more processors;

system memory; and one or more physical storage media having stored thereon computer-executable instructions that when executed cause the client computer system to:

identify a client-side windows display priority order and a client-side windows state information generated at the client computing system for displaying windows for local applications;

receive a server-side windows display priority order and a server-side windows state information from the server computing system, the server-side windows state information generated at the server computing system for displaying windows for remote applications, the server side state information including creation instructions for recreating individual windows for remote applications at the client computing system;

formulate a combined windows display priority order that provides a single display priority ordering collectively applicable to presentation of individual windows for local applications and to presentation of individual windows for remote applications at the client computing system such that individual windows for remote applications are presented based on a windows display priority order formulated at the client computing device and the client computing device does not view windows for remote applications as all having the same windows display priority order, the combined windows display priority order based on the client-side windows display priority order and the client-side windows state information along with the server-side windows display priority order and the server-side windows state information, the combined windows display priority order including a combined set of ordering instructions for displaying individual windows of both local applications and remote applications at the client computing system in accordance with the combined windows display priority order, the combined windows display priority order indicating that the display priority for at least one local application is between the display priority of a first remote application and the display priority a second remote application; and present one or more windows for local applications along with one or more windows for remote applications at the client computing system in accordance with the combined windows display priority order so as to present a combination of windows from both local applications and remote applications based on the single display priority ordering, presentation of the one or more windows for remote applications including the client computer system recreating individual windows for remote applications in accordance with the creation instructions in the server side state information, presentation of the one or more windows also including presenting the window for the at least one local application between the window for the first remote application and the window for the second remote application; and the server computing system configured to interacting with applications to present data in windows at the server computer system, the server computing system providing data for remote presentation at the client computing system through interoperation with the client computing system, remotely presented data at the client computing system presented along with data of local applications at the client computing system, the server computing system including:

one or more processors;

system memory; and one or more physical storage media having stored thereon computer-executable instructions that when executed cause the server computer system to:

identify a server-side windows display priority order and a server-side windows state information generated at the server computing system for ordering individual windows for applications at the server computer system that appear as remote applications at the client computer system, the server-side windows display priority order and server-side windows state information for use in presenting individual windows remotely at the client computing system for applications that appear as remote applications at the client computing system, the server side state information including creation instructions for recreating individual windows for applications that appear as remote applications at the client computing system;

transmit the server-side windows display priority order and the server-side windows state information to the client computing system for use in formulating a combined windows display priority order that provides a single display priority ordering applicable to presentation of remotely presented windows from the server computing system presented at the client computing system and to presentation of windows for local applications presented at the client computing system;

receive the combined windows display priority order from the client computing system, the combined windows display order collectively applicable to individual windows for applications local to the client computing device and to individual windows for applications that appear as remote applications at the client computing device such that individual windows for applications that appear as remote applications are presented based on a windows display priority order formulated at the client computing device and the client computing device does not view windows for applications that appear as remote applications as all having the same windows display priority order, the combined windows display priority order based on a client-side windows display priority order and a client-side windows state information along with the server-side windows display priority order and the server-side windows state information, the combined windows display priority order including a combined set of instructions for displaying windows of both local applications and remote applications at the client computing system in accordance with the combined windows display priority order, the combined windows display priority order indicating that the display priority for at least one local application is between the display priority of a first application that appears as remote and the display priority of a second application that appears as remote; and present windows at the server computing system in accordance with combined windows display priority order such that when the windows are subsequently remotely presented at the client computing system the windows are appropriately ordered from presentation at the client computing system relative to windows for local applications of the client computing system.

20. The method of claim 19, wherein the terminal server session between the client and the server computing systems includes using remote desktop applications.

21. At a client computing system in a computing environment comprising a plurality of computing systems, the client computing system interacting with applications to present data in windows at the client computing system, the client computing system presenting data for one or more local applications running locally at the client computing system, the client computing system also presenting data for one or more remote applications running remotely at a server computer system through interoperation with the server computing system, a method for synchronizing the presentation of windows between the client computing system and the server computing system, the method comprising:

- an act of the client computing system identifying a client-side windows display priority order;
- an act of the client computing system receiving a server-side windows display priority order and a server-side windows state information from the server computing system;
- an act of the client computing system formulating a combined windows display priority order based on the client-side windows display priority order and the server-side windows display priority, the combined windows display priority order providing a single display priority ordering collectively applicable to presentation of individual windows for local applications and to presentation of individual windows for remote applications at the client computing system, the combined windows display priority order including a combined set of ordering instructions for displaying individual windows of both local applications and remote applications at the client computing system in accordance with the combined windows display priority order; and
- an act of the client computing system presenting a plurality of windows in accordance with the combined windows display priority order at the client computing system, the plurality of windows including one or more windows for local applications and one or more windows for remote applications so as to present a combination of windows from both local applications and remote applications based on the single display priority ordering, presentation of the plurality of windows including:
  - presenting a first window for a remote application, the first window having a first display priority order in the combined windows display priority;
  - presenting a second window for another remote application, the second window having a second display priority order in the combined windows display priority, the second display priority ordering differing from the first display priority order; and
  - interleaving presentation of a third window for a local application between the first window and the second window, the third window having a third display priority order in the combined windows display priority, the third display priority order being between the first display priority order and the second display priority over within the combined windows display priority.

* * * * *